United States Patent Office 2,923,878
Patented Feb. 2, 1960

2,923,878

METHODS OF AND APPARATUS FOR TESTING ARTICLES

Alfred A. Flowers, Chicago, Ill., and Gerald A. Mitchell, White Bear Lake, Minn., assignors to Western Electric Company, Incorporated, New York, N.Y., a corporation of New York Application May 27, 1955, Serial No. 511,553

15 Claims. (Cl. 324—26)

This invention relates to methods of and apparatus for testing articles, and more particularly to methods of and apparatus for testing magnetrons.

In the manufacture of magnetrons or similar devices, the magnetrons are tested by supplying sufficient power thereto to maintain constant anode current while adjusting the cavities of the magnetron through its entire operable range. Of course, for certain adjustments of the cavities, very high voltages are required to maintain the constant average anode current, which voltages are much higher than those required at other adjustments of the cavities, and it is highly essential that arcing of the magnetron be maintained at a minimum during such tests. Also, it has been extremely difficult to maintain constant anode current of the magnetrons for the various adjustments of the cavities thereof.

An object of the invention is to provide new and improved methods of and apparatus for testing articles.

Another object of the invention is to provide methods of and apparatus for testing magnetrons.

Another object of the invention is to provide methods of and apparatus for operating the magnetron with a constant anode current while adjusting the cavities of the magnetron through a wide range.

A further object of the invention is to provide methods of and apparatus for providing constant anode current in a magnetron while bearing the cavities of the magnetron to its operative range and suppressing any arcing which may occur in the magnetron.

In a method and an apparatus illustrating certain features of the invention, a magnetron is pulsed at a predetermined frequency and the average anode current thereof is measured. A network may be provided and means for discharging the network to pulse the magnetron along with variable means for charging the network. The anode current of the magnetron is measured, and the charging means is varied inversely with the anode current to keep the anode current constant. An arc detector also may be provided in conjunction with means for blocking the charging means while arcing occurs.

Figure 1:
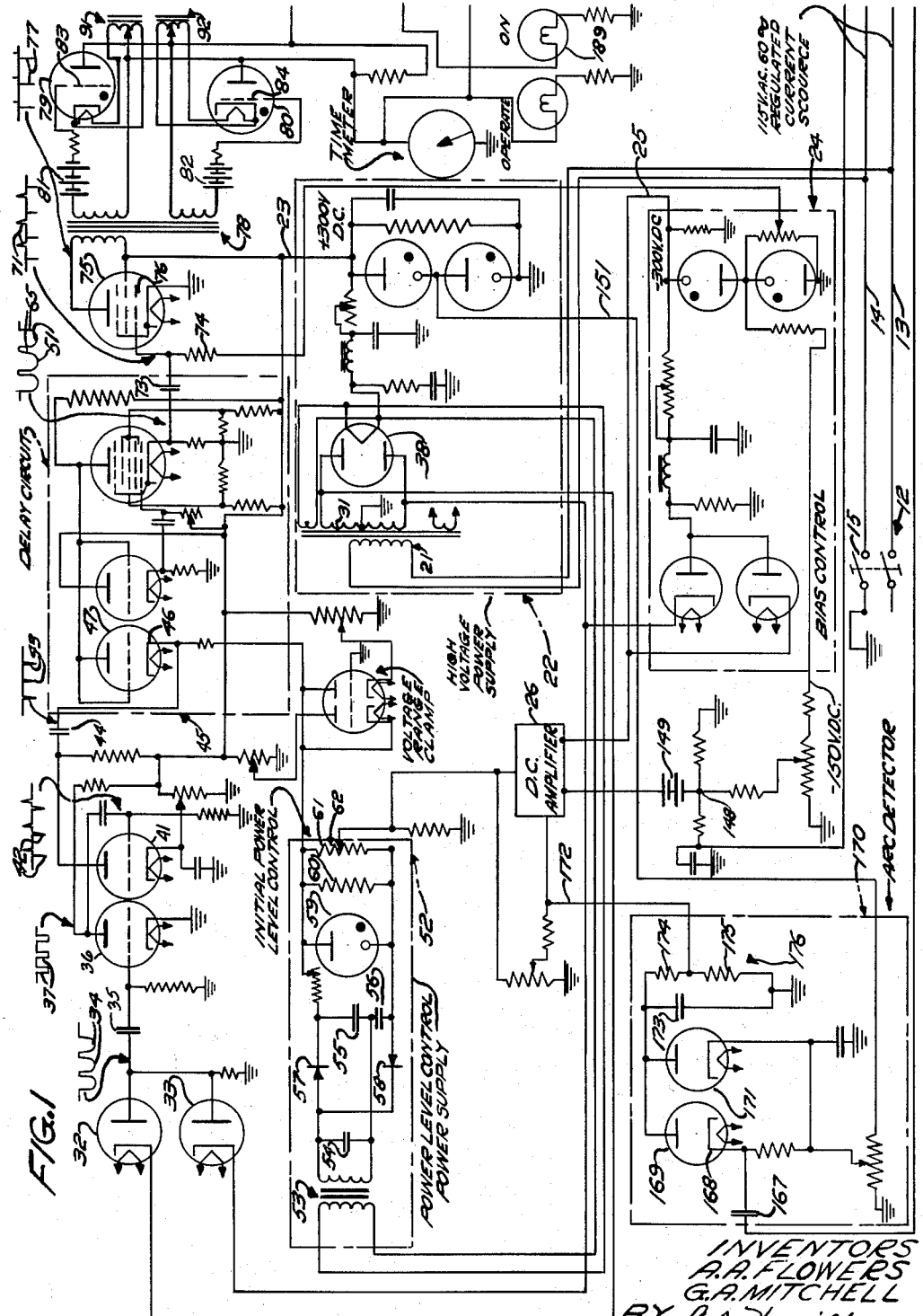
Figure 2:
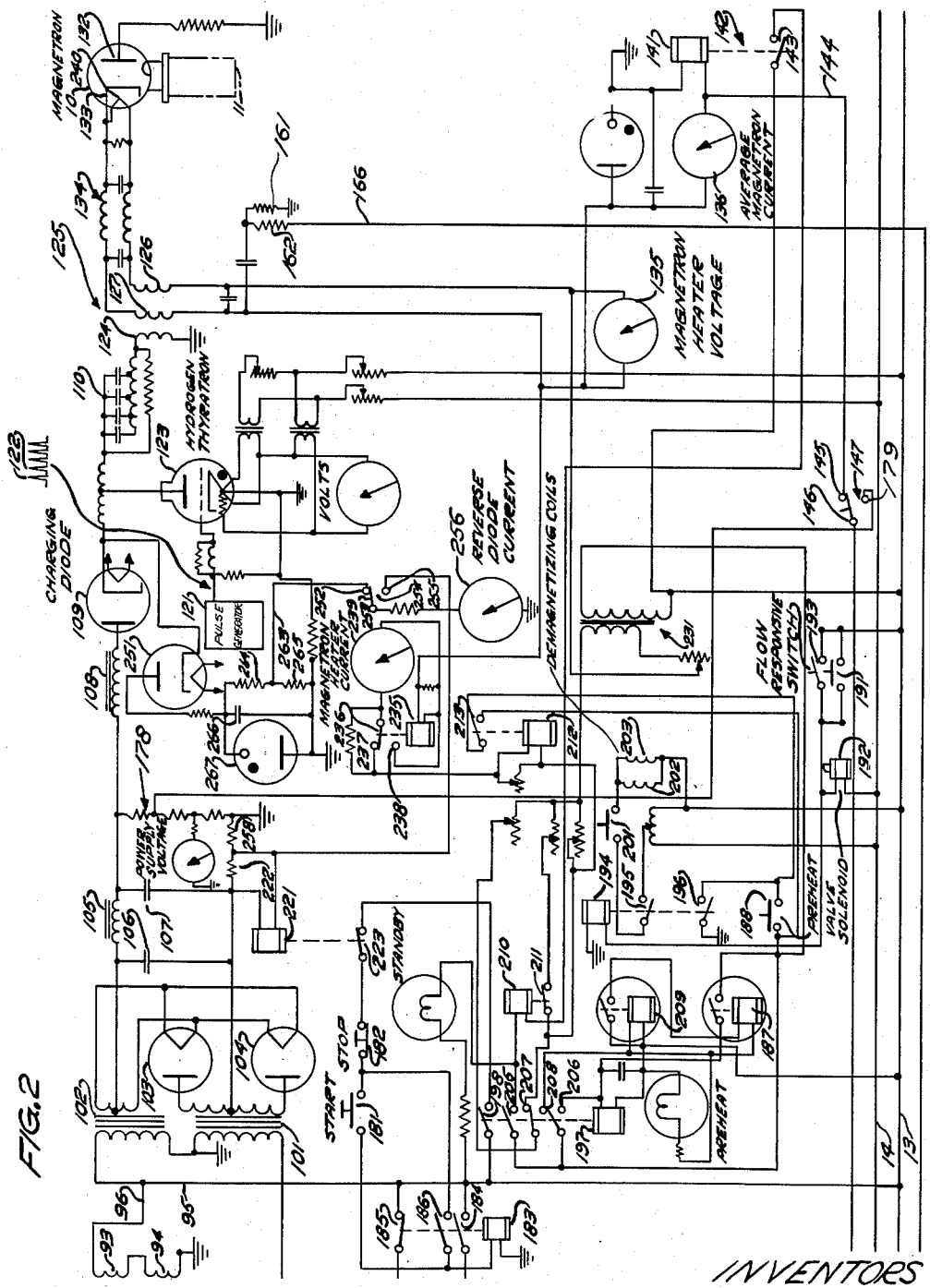

A complete understanding of the invention may be obtained from the following detailed description of a method and an apparatus for forming a specific embodiment of the invention when read in conjunction with the appended drawings, in which Fig. 1 is a diagrammatic view of a portion of the circuit for practicing a method forming one embodiment of the invention, and Fig. 2 is the remainder of the circuit with the lefthand end of Fig. 2 fitting to the righthand end of Fig. 1.

Referring now in detail to the drawings, there is shown therein an apparatus or circuit for and a method of testing a magnetron 10 through the entire range of adjustment of a resonant cavity 11 of a well known type, which provide a constant magnetron anode current during the test and suppress arcing of the magnetron during the periods that high voltages are required to keep the anode current constant. The circuit includes a power line 12 having a positive conductor 13, a grounded conductor 14 and a manually operable toggle switch 15 therein. The power line 12 supplies power to a transformer 21 of a high direct current voltage supply circuit 22 of a well known type having an output conductor 23 maintained at positive 300 volts D.C. A bias control circuit 24 for providing a constant negative 300 volts D.C. also is provided, and has an output conductor 25 at the latter voltage leading to a D.C. amplifier 26.

A secondary winding 31 of the transformer 21 supplies A.C. power to rectifier tubes 32 and 33, which produce, at a rate of 120 cycles per second, voltage pulses 34. The transformer 21 also supplies power to a full-wave rectifier 38 to form pulses in phase with the pulses 34. The pulses 34 are transmitted through a capacitor 35 to a vacuum tube 36, which amplifies, squares off and inverts the pulses 34 to form pulses 37. The pulses 37 are differentiated, amplified and inverted by a vacuum tube 41, which also clips negative peaks 42 off pulses to form triggering pulses 43 at the rate of 120 pulses per second, and the pulses 43 are transmitted through a coupling capacitor 44. The pulses 43 trigger a delay circuit 45 of a well known type, such as, for example, a phantastron delay circuit, at the rate of 120 times per second, the pulses 43 being applied to a cathode 46 of a vacuum tube 47 which isolates the circuit 45 after each triggering thereof.

The voltage of the cathode 46 is affected by a power level control circuit 52, which includes a transformer 53 fed from the circuit 22, capacitors 54, 55 and 56, rectifiers 57 and 58, a voltage-regulating gas-filled tube 59, a resistor 60 and a voltage divider 61. The output of the amplifier 26 is connected by a contactor 62 to the voltage divider 61 to set the initial magnetron current level. The voltage of the pulses to the cathode 46, which is determined by the setting of the contactor 62 and the output of the D.C. amplifier 26, controls the width or duration of the pulses 51.

The pulses 51 are differentiated to form positive pulses 71 from the trailing edges 65 of the pulses 51 by a capacitor 73 and a resistor 74. The pulses 71 actuate a vacuum tube 75 through a control grid 76 to form negative pulses 77. The pulses 77 actuate a transformer 78, which inverts the pulses 77 to fire thyratron tubes 79 and 80 by alternate pulses 77, each tube being fired by alternate pulses at 60 cycles per second. Batteries 81 and 82 provide a normally negative bias for grids 83 and 84, the thyratrons 79 and 80 are mounted in back-to-back relationship. Power is supplied to the thyratrons 79 and 80 through transformers 91 and 92 which have primaries 93 and 94 connected in series, and are fed power from the power line conductor 13 to conductors 95 and 96. The thyratron tubes 79 and 80 pulse a transformer 101 each time one of the tubes 79 and 80 is fired. The duration of each pulse to the transformer 101 is inversely proportional to the delay of pulses 77 as determined by the delay circuit 45. Positive power is supplied by the power line 12 alternately to the thyratron tubes 79 and 80 so that each of the tubes 79 and 80, if triggered, would fire at sixty cycles per second. However, the triggering of the tubes 79 and 80 is controlled by the pulses 77, which are delayed by the circuit 45 relative to the half cycle positive pulses applied to the plates of the thyratron tubes 79 and 80. Hence, the portion of each positive half wave to one of the plates of the tubes 79 and 80 that a tube is conductive is inversely proportional to extent of delay of pulses 77 from the start of each positive half wave. That is, each tube 79 and 80 is fired only the portion of each positive half wave to the plate thereof after the triggering of that tube. The energy output of each tube 79 and 80 is increased with decrease in delay of the circuit 45 and decreases with increased delay of the circuit 45.

The transformer 101 steps up the voltage, and the output thereof is rectified by tubes 103 and 104. The output of the tubes 103 and 104 is fed to a choke coil 105 forming a network with capacitors 106 and 107, and also is fed to a charging choke coil 108 and a charging diode 109 to an inductance capacitance network 110. A transformer 102 supplies filament current to the tubes 103 and 104.

A pulse generator 121 of a well known type generates positive pulses 122 at a predetermined rate of several thousand pulses per second, and the pulses 122 fire a hydrogen-filled thyratron tube 123 at that rate. Each time the tube 123 is fired, the network 110 is discharged to cause a current flow through a primary winding 124 of a transformer 125 to pulse the magnetron 10 through secondary windings 126 and 127. The portion of each cycle of the power line 12 that each of the tubes 79 and 80 is fired controls the extent of charging of the network 110, the greater the time that the tubes 79 and 80 are fired, the greater the charge on the network 110. The greater that the charge on the network 110 is, the greater is the pulse of the transformer 125 for each discharge of the network 110 and the higher the average anode current of the magnetron 10 is, the magnetron 10 being fired by each pulse 122 of the pulse generator 121 through the transformer 125. The secondary windings 126 and 127 are connected to a cathode 133 of the magnetron 10 through an inductive-capacitance network 134.

The magnetron heater voltage is measured by a voltmeter 135 and the average magnetron current is measured by an ammeter 136. A current proportional to the average magnetron current goes through a winding 141 of a relay 142 to actuate the relay 142 to close contacts 143 of the relay. The voltage across the winding 141 is proportional to the average magnetron current and is transmitted by a conductor 144 through contacts 145 and 146 of a switch 147 to a point 148 connected by a battery 149 to the bias control of the D.C. amplifier 26, the amplifier 26 being fed power from the voltage supply 22 through a conductor 151. Whenever the average anode current of the magnetron 10 increases, the voltage applied to the point 148 increases and the voltage output of the amplifier 26 increases, which increases the voltage from the power level control circuit 52 to the cathode 46 of the delay circuit 45, and the delay or width of the pulses 51 is increased. This, in turn, causes the thyratrons 79 and 80 to be fired at a later time in each half cycle of the power line 12 to decrease the charge on the network 110, which, in turn, decreases the anode current of the magnetron 10. The converse is also true when the magnetron current decreases. Thus the average anode current of the magnetron 10 is kept constant.

The resonant cavity 11 is adjusted through its range as desired by a well known means (not shown) but the anode current thereof is kept constant. If the operating voltage on magnetron 10 should become so high in maintaining the average anode current that arcing occurs in the magnetron, an arc-pickup resistor 161 picks up the pulses of each arc, which are conducted through the resistor 161 to ground. Normally, without arcing, positive pulses appear across the resistor 161. But, when arcing occurs, large negative pulses also occur and are transmitted through a conductor 166, a resistor 162 and a capacitor 167 to a cathode 168 of a tube 169 of an arc detector circuit 170, which also includes a positive-pulse-clipping tube 171. This increases the flow of current through the tube 169 to increase the voltage on a conductor 172 connected to the D.C. amplifier 26. This causes the amplifier 26 to increase its output voltage to raise the voltage level output of the control circuit 52, which raises the voltage of the cathode 46 to increase the delay of the circuit 45 and make the pulses 51 wider. This, in turn, decreases the operative portions of each half cycle of the tubes 79 and 80, thereby decreasing the charges on the network 110 to cut down the power supplied to the magnetron 10 and stop the arcing immediately. The length of time in which the magnetron anode current is reduced to allow the magnetron 10 to stabilize and stop arcing is determined by the time constant of a network 176, which includes a capacitor 173 and series resistors 174 and 175. The resistor 174 serves to isolate the network 176 from the low impedance of the D.C. amplifier 26.

The control circuit is also arranged to maintain a constant power supply voltage for certain tests. This is accomplished by operating switch 147 closing a contact 179, which is connected to a voltage divider 178 to transmit the changes in power supply voltage to the point 148. An increase in power supply voltage decreases the periods of firing of the thyratron tubes 79 and 80 in the same manner that an increase in magnetron anode current decreases the power supplied to the magnetron. Thus, the circuit may be selectively set to maintain constant power supply voltage throughout the settings of the resonant cavity.

In starting the circuit for a test with the switch 12 closed and the switch 147 set as desired either for constant magnetron anode voltage with the contacts 146 and 179 closed or constant magnetron anode current with the contacts 145 and 146 closed, a manually operable momentary switch 191 is closed momentarily to energize a solenoid 192 to start water to a water load (not shown) which closes a flow responsive switch 193 paralleling the switch 191. The closing of the switch 191 actuates a relay 194 to close contacts 195 and 196 and the switch 193 holds the relay 194 energized. A magnetron heater preheat switch 188 is closed momentarily to energize a transformer 231 and bring in a relay 212 to close contacts 213 to maintain the transformer 231 energized. The closing of the switch 188 also energizes a time delay relay 209, which after a predetermined delay closes its contacts to energize a relay 187 to energize a relay 197 to close contacts 198, 205 and 206 and open contacts 207 and 208.

The circuit is provided with a starting switch 181 and a stop switch 182. The start switch 181 is closed momentarily to actuate a relay 183, which locks itself in through contacts 184 opens contacts 195 and closes holding contacts 186. The contacts 185 serve to supply power to an indicating lamp 189. The switch 181 is released when the relay 183 locks itself in through the contacts 186. The contacts 184 then supply power to the thyratron tubes 79 and 80. A relay 221 having a resistance 222 across its winding is provided to open contacts 223 when excessive current is supplied from the tubes 103 and 104, and drops out the relay 183 in case of an overload. A relay current supply transformer 231 is provided for supplying current to the several relays.

While the magnetron 10 is being pulsed, a voltage is created across a coil 235 to move a contact 236 out of engagement with a contact 237 and into engagement with a contact 238 to bring a ammeter 239 into series with a heater filament 240 of the magnetron to measure the magnetron heating current. A diode 251 is connected in reverse or back-to-back arrangement to the charging diode 109. Contacts 252 and 253 of a switch 254 also having a contact 255 connect the diode 251 to an ammeter 256, while the contact 255 is designed to be engaged by the contact 253 and is connected to the relay 221 and to resistors 222 and 258. The contact 252 is connected by a conductor 263 to resistors 264 and 265 connected in parallel with a capacitor 266 and a gas-filled diode 267.

The above-described method and apparatus serve to test the magnetron 10 with a constant anode current or with constant anode voltage regardless of the power required by any particular adjustment of the resonant cavity 11. If the voltage required to keep the anode current constant is so high that it at times causes arcs on the magnetron, the magnetron is protected by the arc pickup 161 and the arc detector circuit 170. The power supplied to the magnetron then is made low for several seconds, after which, the arcing having disappeared, the power to the magnetron is raised again. If desired, the elements of the magnetron may be connected to a suitable recorder during the testing thereof so that the operation of the magnetron may be recorded. For example, the recorder may be actuated by the power output of the magnetron as determined by the load in the cavity 11.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. The method of maintaining a constant electrical condition with respect to an article under test having a variable impedance, which comprises applying a continuous train of half-wave positive pulses of a predetermined frequency to the anode of a triggerable tube, triggering the tube with triggering pulses of said frequency, applying the output of the tube to such an article, measuring an electrical condition, and varying the occurrence of each triggering pulse relative to the positive pulse concurrent therewith in accordance with variation in the electrical condition to vary the duration of the application of the output of the tube to the article under test.

2. The method of maintaining a constant anode current on a magnetron, which comprises sending the output of a triggerable tube to a storage circuit supplying current to the anode of a magnetron, applying half-wave positive pulses of a predetermined frequency to the plate of the triggerable tube, forming a sharp triggering positive pulse with a predetermined delay after the start of each half-wave pulse, applying the triggering pulses to the tube to trigger it, measuring the anode current of the magnetron, and varying said delay proportionally to the anode current measured.

3. The method of maintaining constant anode voltage applied to the anode of a magnetron, which comprises applying to a storage circuit the output of a triggerable tube, applying an input of half-wave positive pulses of a predetermined frequency to the tube, creating a sharp triggering pulse with a predetermined delay from the start of each positive pulse, applying each triggering pulse to the tube to trigger it, measuring the voltage on the anode of the magnetron, and varying said delay proportionally to the voltage measured.

4. An apparatus for testing magnetrons, which comprises a network, means for discharging the network at a predetermined frequency to pulse the magnetron, a pulsing means operating at a predetermined frequency for charging the network with pulses of a predetermined duration, and means responsive to an electrical condition of the magnetron for varying the duration of the pulses produced by said pulsing means inversely with respect to variation in said condition of the magnetron.

5. An apparatus for testing magnetrons, which comprises means for pulsing a magnetron at a predetermined frequency, a network, means for discharging the network to pulse the magnetron, means for periodically charging the network with pulses of a predetermined duration, and means responsive to the anode current of the magnetron for regulating the charging means to vary the duration of charge applied to the network inversely with respect to the anode current of the magnetron.

6. An apparatus for testing magnetrons, which comprises means for pulsing a magnetron at a predetermined frequency, a network, means for pulsing the magnetron from the network, means for periodically charging the network, means responsive to an electrical condition of the magnetron for varying the duration of charge by the charging means inversely with respect to said electrical condition of the magnetron, means for detecting arcs of the magnetron, and means responsive to the arcing detecting means for blocking the charging means.

7. A testing circuit, which comprises an electrical storage circuit serving as a power supply for an article to be tested, means for sending half-wave pulses of varying duration toward the storage circuit, means for blocking a portion of each pulse to control the duration of each pulse, and means responsive to current in the article for varying the blocking means to vary the duration of each pulse.

8. A testing circuit, which comprises an electrical storage circuit serving as a power supply to an anode of a magnetron to be tested, means for sending half-wave pulses toward the storage circuit, triggerable electric valving means positioned between the sending means and the storage circuit, means for forming a control pulse at the start of each half-wave pulse, a phantastron circuit triggerable by the control pulses for forming an output pulse of a width proportional to the amplitude of pulses triggering the phantastron circuit, means responsive to the magnetron for varying the amplitude of the control pulses in accordance with a power component of the magnetron, and means for forming triggering pulses at the trailing ends of said output pulses for triggering the valving means during each half-wave pulse after a delay equal to the width of each output pulse.

9. A device for pulsing a magnetron, which comprises an A.C. power supply of a predetermined frequency, means responsive to the power supply for forming pulses at a frequency proportional to the frequency of the power supply, a delay circuit for forming wide pulses in response to pulses from the pulse-forming means, means for forming triggering pulses at the trailing end of the pulses formed by the delay circuit, a pair of thyratron tubes connected in back-to-back relationship and operated by the triggering pulses, an inductance-capacitance network for supplying power to pulse a magnetron, means for discharging the network to pulse the magnetron, a power level control circuit for regulating the period of the delay circuit, and means responsive to a power component of the magnetron for regulating the power level control circuit.

10. A device for pulsing a magnetron, which comprises an A.C. power supply, means responsive to the power supply for forming pulses at the frequency of the power supply, a delay circuit for forming wide pulses in response to pulses from the pulse forming means, means for forming pulses at the trailing end of the pulses formed by the delay circuit, a pair of thyratron tubes connected in back-to-back relationship and operated by the last-mentioned pulses, an inductance-capacitance network, pulse creating means connected in series with the inductance-capacitance network for pulsing a magnetron, a hydrogen thyratron for discharging the network, means for generating pulses at a predetermined frequency for discharging the hydrogen thyratron to discharge the network whereby the anode current of the magnetron is pulsed by the charge on the network, a power level control circuit for regulating the period of the delay circuit, means responsive to the average anode current of the magnetron for varying the power level control circuit, an arc pickup responsive to arcing of the magnetron, an arc detector circuit responsive to the arc pickup for actuating the power level control circuit to widen the pulse of the delay circuit, and means responsive to the anode current control.

11. In a circuit for controlling the output of a magnetron, a capacitance storage network, means for cyclically discharging the network to operate the magnetron, a delay circuit having a biased tube for controlling the period of operation thereof, a control circuit for impressing biasing potential on said tube, means for cyclically operating said delay circuit, means actuated by said delay circuit for producing charges in proportion to the periods of operation of said delay circuit, means for applying said charges to said storage network, and means responsive to variations in the magnetron current for varying said control circuit to vary the biasing potential whereby the period of operation of the delay circuit is accordingly varied.

12. In a circuit for controlling the operation of a magnetron, means for storing electrical energy, means for cyclically discharging the storing means to operate the magnetron, a source of alternating electrical power, means connected to said power source for producing a train of pulses, a cathode controlled tube operated by said train of pulses, a delay circuit actuated by said cathode controlled tube for producing delayed trigger pulses, means for biasing said cathode of said controlled tube to regulate the delay of the trigger pulses with respect to said train of pulses, a pair of tubes connected to be alternately conditioned for operation by said alternating power source, means for applying said trigger pulses to alternately operate said conditioned pair of tubes, means operated by each operation of a tube of said pair for applying a charge to said storage means in proportion to the period of operation of said tubes, and means responsive to operation of said magnetron for controlling the biasing means in accordance with current flow through said magnetron whereby variations in current flow effectuate a change in said biasing means to maintain constant the current flow through said magnetron.

13. In a control circuit for pulsing an electronic device, a storage circuit adapted to receive and store electrical charges, means for cyclically discharging the storage circuit to supply current pulses to the electronic device, means for charging said storage circuit with pulses of varying duration, and means responsive to current in the electronic device for inversely controlling the charging means to produce pulses of durations inversely varying with the magnitude of current in the tube.

14. In a circuit for controlling current flow through an electronic device, an energy storage circuit, means for periodically discharging the storage circuit to apply current pulses to the electronic device, means for applying pulses of varying duration to the energy storage circuit, a control circuit for regulating the duration of each pulse of the pulse applying means, means responsive to an arcing condition in the electronic device for producing a control pulse, and means actuated by the control pulse for operating the regulating circuit to reduce the duration of pulses from the pulse applying means.

15. In a circuit for controlling current flow through an electronic device, an energy storage circuit, means for periodically discharging the storage circuit to supply current pulses to operate the electronic device, a variable delay circuit for periodically applying pulses of varying duration to said energy storage circuit, a source of voltage connected to the variable delay circuit for regulating the duration of said pulses, a normally unoperated tube connected to and adapted to control said voltage source, and means operated by an arcing condition in said electronic device for operating said electronic tube to change the magnitude of voltage applied from the source to the delay circuit.

References Cited in the file of this patent

UNITED STATES PATENTS

| | | |
|---|---|---|
| 2,609,497 | Dawson | Sept. 2, 1952 |
| 2,677,058 | Kirkman | Apr. 27, 1954 |
| 2,688,705 | Fundingsland | Sept. 7, 1954 |
| 2,694,149 | Gross | Nov. 9, 1954 |
| 2,737,586 | Flower | Mar. 6, 1956 |
| 2,786,180 | Cohn | Mar. 19, 1957 |

UNITED STATES PATENT OFFICE

CERTIFICATE OF CORRECTION

Patent No. 2,923,878                                February 2, 1960

Alfred A. Flowers et al.

It is hereby certified that error appears in the printed specification of the above numbered patent requiring correction and that the said Letters Patent should read as corrected below.

Column 4, line 46, for "contacts 195" read -- contacts 185 --; column 5, line 56, after "at a" insert -- second --.

Signed and sealed this 16th day of August 1960.

(SEAL)
Attest:

KARL H. AXLINE
Attesting Officer

ROBERT C. WATSON
Commissioner of Patents